(12) United States Patent
Ogawa et al.

(10) Patent No.: US 11,210,214 B2
(45) Date of Patent: Dec. 28, 2021

(54) STORAGE SYSTEM AND COMPRESSION METHOD OF STORING COMPRESSED DATA FROM STORAGE CONTROLLER PHYSICAL ADDRESS SPACE TO LOGICAL AND PHYSICAL ADDRESS SPACE OF NONVOLATILE MEMORY

(71) Applicants: HITACHI, LTD., Tokyo (JP); HITACHI INFORMATION & TELECOMMUNICATION ENGINEERING, LTD., Kanagawa (JP)

(72) Inventors: Junji Ogawa, Tokyo (JP); Shigeo Homma, Yokohama (JP)

(73) Assignees: HITACHI, LTD., Tokyo (JP); HITACHI INFORMATION & TELECOMMUNICATION ENGINEERING LTD., Kanagawa (JP)

( * ) Notice: Subject to any disclaimer, the term of this patent is extended or adjusted under 35 U.S.C. 154(b) by 120 days.

(21) Appl. No.: 16/570,143

(22) Filed: Sep. 13, 2019

(65) Prior Publication Data

US 2020/0264971 A1 Aug. 20, 2020

(30) Foreign Application Priority Data

Feb. 14, 2019 (JP) .............................. JP2019-024753

(51) Int. Cl.
*G06F 12/02* (2006.01)
(52) U.S. Cl.
CPC .... *G06F 12/0292* (2013.01); *G06F 2212/214* (2013.01); *G06F 2212/401* (2013.01); *G06F 2212/657* (2013.01); *G06F 2212/7201* (2013.01)

(58) Field of Classification Search
CPC ........... G06F 12/0292; G06F 2212/401; G06F 2212/7201; G06F 2212/657; G06F 2212/21

See application file for complete search history.

(56) References Cited

U.S. PATENT DOCUMENTS 6,085,296 A * 7/2000 Karkhanis ........... G06F 12/1009 711/147
2012/0290798 A1* 11/2012 Huang .................. G06F 3/0608 711/154

(Continued)

FOREIGN PATENT DOCUMENTS

JP 2018-49523 A 3/2018

*Primary Examiner* — Chie Yew
(74) *Attorney, Agent, or Firm* — Volpe Koenig

(57) ABSTRACT

A storage system including a storage controller for compressing a data from a host and a plurality of nonvolatile memory drives for writing the compressed data. The storage controller provides the host with a first logical address space as a logical storage area and includes a plurality of first physical address spaces corresponding to the first logical address space and manages storage areas of the plurality of nonvolatile memory drives. Each of the plurality of nonvolatile memory drives includes a second physical address space that manages a physical storage area of the nonvolatile memory and a second logical address space that corresponds to the second physical address space and to each of the plurality of first physical address spaces. The second logical address spaces and the first logical address space are managed with a common size and a common management size, and leading addresses are aligned with the management size.

11 Claims, 13 Drawing Sheets

(56) References Cited

U.S. PATENT DOCUMENTS

| | | |
|---|---|---|
| 2018/0088811 A1 | 3/2018 | Kanno |
| 2020/0026436 A1* | 1/2020 | Ou .................. G06F 3/0658 |

* cited by examiner

FIG. 3

AFTER-COMPRESSION DATA SIZE INFORMATION OF DKC SIDE  110

| LEADING ADDRESS | AFTER-COMPRESSION DATA SIZE |
|---|---|
| 0x0000 | 0x12 |
| 0x0020 | 0x20 |
| 0x0040 | 0x08 |
| 0x0060 | 0x1A |
| 0x0080 | 0x1A |
| 0x00A0 | 0x08 |
| 0x00C0 | 0x11 |
| ⋮ | ⋮ |
| 0x1FE0 | 0x14 |

FIG. 4A

LOGICAL-PHYSICAL CONVERSION INFORMATION OF SSD (A)   213

| LOGICAL ADDRESS | PHYSICAL ADDRESS |
|---|---|
| 0x0000 | NAND#10-Block#20-Page#30-Offset#0 |
| 0x0010 | NAND#10-Block#20-Page#30-Offset#18 |
| 0x0020 | NAND#3-Block#30-Page#22-Offset#2 |
| 0x0030 | NOT ALLOCATED |
| 0x0040 | NAND#4-Block#40-Page#40-Offset#7 |
| 0x0050 | NOT ALLOCATED |
| 0x0060 | NAND#10-Block#20-Page#31-Offset#4 |
| ⋮ | ⋮ |
| 0x1FE0 | NAND#2-Block#23-Page#51-Offset#8 |

FIG. 4B

LOGICAL-PHYSICAL CONVERSION INFORMATION OF SSD (A)   213

| LOGICAL ADDRESS | PHYSICAL ADDRESS |
|---|---|
| 0x0000 | NAND#10-Block#20-Page#30-Offset#0 |
| 0x0010 | NAND#10-Block#20-Page#30-Offset#18 |
| 0x0020 | NAND#3-Block#30-Page#22-Offset#2 |
| 0x0030 | NOT ALLOCATED |
| 0x0040 | NAND#4-Block#40-Page#40-Offset#7 →NAND#10-Block#14-Page#21-Offset#4 |
| 0x0050 | NOT ALLOCATED |
| 0x0060 | NAND#10-Block#20-Page#31-Offset#4 |
| ⋮ | ⋮ |
| 0x1FE0 | NAND#2-Block#23-Page#51-Offset#8 |

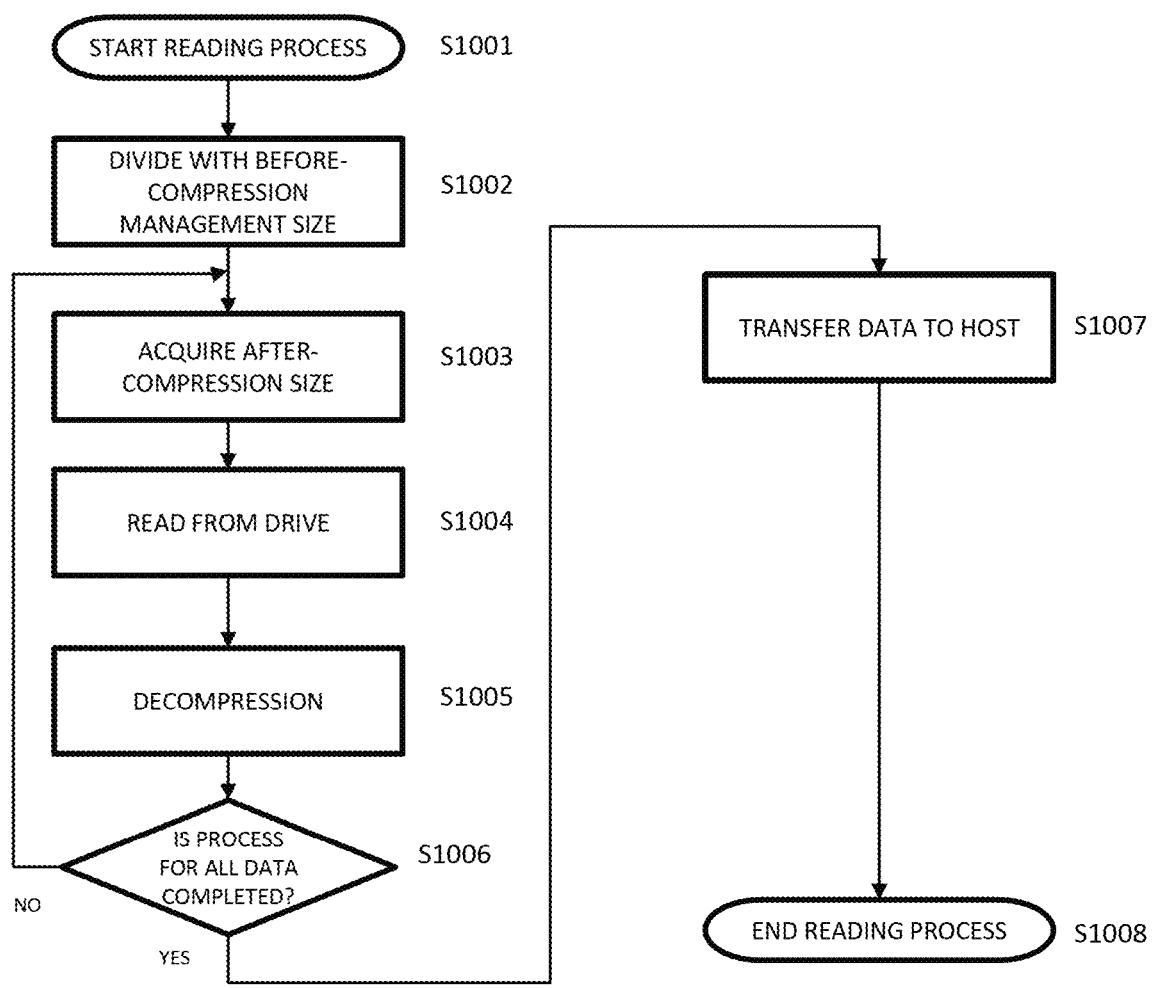

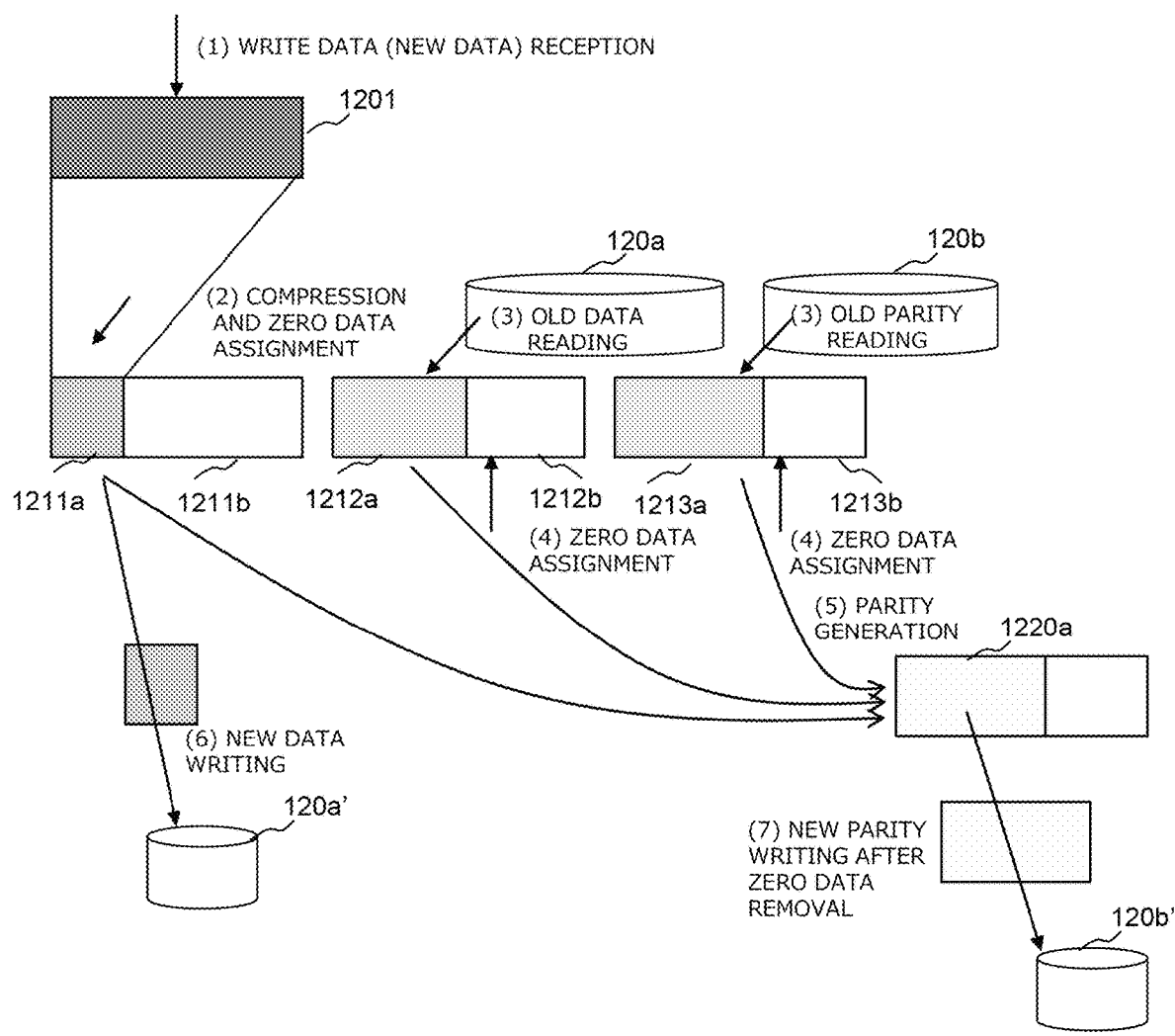

STORAGE SYSTEM AND COMPRESSION METHOD OF STORING COMPRESSED DATA FROM STORAGE CONTROLLER PHYSICAL ADDRESS SPACE TO LOGICAL AND PHYSICAL ADDRESS SPACE OF NONVOLATILE MEMORY

BACKGROUND OF THE INVENTION

1. Field of the Invention

The present invention relates to a data compression technique for a storage system.

2. Description of the Related Art

A storage controller arranges data, which are received from an upper-level device, on a drive by using redundant arrays of inexpensive disks (RAID) technology. At this time, the data is stored at a position that can be calculated by simple calculation on the basis of the configuration information of the storage system.

On the other hand, in a case where compression and deduplication are realized by the storage controller, in order to store more data than an actual capacity, it is necessary to pack and arrange the after-compression data. In addition, since a compression rate differs according to the data, the length of the after-compression data differs, and thus, an address conversion logic for performing complicated address management is required instead of the simple calculation as described above.

Furthermore, in a case where the drive of the storage destination is an SSD that is a nonvolatile memory drive using a NAND flash, due to the property of the NAND (impossibility of overwriting, unit of erasing>unit of writing (unit of erasing is larger than unit of writing)), the SSD controller of the solid state drive (SSD) in which the NAND Flash is installed also requires position conversion (logical-physical address conversion: address conversion logic).

The address conversion logic by the storage controllers and the address conversion logic of the SSD controller consume processors and memory resources of the storage controller and SSD controller. In particular, in the case of compressing the data, the capacity efficiency is improved as the unit of the capacity management is reduced. However, on the contrary, since the management resources are increased, attention has to be paid to the size of the management resources.

There is JP 2018-49523 A regarding the address conversion logic. JP 2018-49523 A discloses a memory system that manages an after-compression data of which data length is variable.

In the memory system of JP 2018-49523 A, on the basis of a difference between the data length of the write data and the data length of compressed data, a host sets an address conversion table to a state where a physical address is mapped to each of logical addresses in a first range corresponding to a data length of a compressed data starting from a leading logical address of a first logical address range in which a write data is to be written and no physical address is mapped to each of the logical addresses in a second range corresponding to the difference.

However, the memory system of JP 2018-49523 A is intended for a single SSD connected to the host, which is an upper-level device, and the address conversion logic on the storage controller side at the time of managing the physical address of the single SSD with the address conversion table on the host and writing the write data from the host to a plurality of SSDs by a data redundancy technique of the storage controller, for example, a RAID technique or the like is not described.

As a result, the problem of the waste of management resources by both the address conversion logic on the storage controller side and the address conversion logic on the SSD controller side is not mentioned.

SUMMARY OF THE INVENTION

The invention is to provide a storage system and a compression method that solve a problem that both a storage controller and an SSD controller require address conversion process and consume a large amount of management resources.

According to an aspect of the invention, there is provided a storage system having a storage controller connected to a host and a plurality of nonvolatile memory drives connected to the storage controller, in which the storage controller compresses a data from the host, provides the host with a first logical address space as a logical storage area, manages a before-compression data to be stored in the first logical address space, and manages an after-compression data to be written to a plurality of first physical address spaces that correspond to the first logical address space and that respectively manage storage areas of the plurality of nonvolatile memory drives, in which each of the plurality of nonvolatile memory drives includes a nonvolatile memory, includes a second physical address space that manages a physical storage area of the nonvolatile memory and a second logical address space that corresponds to the second physical address space and that corresponds to each of the plurality of first physical address spaces, manages the after-compression data to be stored in the second logical address space, and writes the compressed data to the second physical address space, in which the second logical address space and one of the plurality of first physical address spaces are managed with a common size and a common management size, and the first logical address space and the plurality of first physical address spaces are managed with a common size and a common management size, and in which, in the first logical address space, the plurality of first physical address spaces, and a plurality of the second logical address spaces, leading addresses are aligned with the management size.

According to this invention, it is possible to eliminate the waste of the management resources by performing logical-physical address conversion of a storage controller of a storage system and logical-physical address conversion of a controller of an SSD in a twofold manner.

BRIEF DESCRIPTION OF THE DRAWINGS

FIG. 3 is a diagram illustrating after-compression data size information managed by a storage controller;

FIG. 4A is a diagram illustrating an example of a logical-physical conversion table managed by the SSD;

FIG. 4B is a diagram illustrating an example of a logical-physical conversion table managed by the SSD;

FIG. 10 is a flowchart illustrating a reading operation of the storage controller;

FIG. 12 is a diagram illustrating an operation of an RAID process after data compression.

DETAILED DESCRIPTION OF THE PREFERRED EMBODIMENTS

Embodiments will be described with reference to the drawings. The embodiments described below do not limit the invention disclosed in the claims, and all the elements and combinations thereof described in the embodiments are not necessarily essential for the solution of the invention.

In the following description, information may be described using the expression [AAA table], but the information may be expressed in any data structure. That is, [AAA table] can be [AAA information] to indicate that the information does not depend on the data structure.

In addition, in the following description, the processor is typically a central processing unit (CPU). The processor may include a hardware circuit that performs a portion or all of processes.

In addition, in the following description, the processes may be described with [program] as a subject of operation, but the program is executed by the processor, and since a determined process is appropriately performed as storage resources (for example, a memory) or the like, the actual subject of the processes is the processor. Therefore, the processes described with the program as the subject of operation may be the processes performed by a device including the processor. In addition, a hardware circuit that performs a portion or all of the processes performed by the processor may be included.

A computer program may be installed on the device from a program source. The program source may be, for example, a program distribution server or a storage medium that can be read by a computer.

EXAMPLE

<1. System Configuration>

Figure 1:
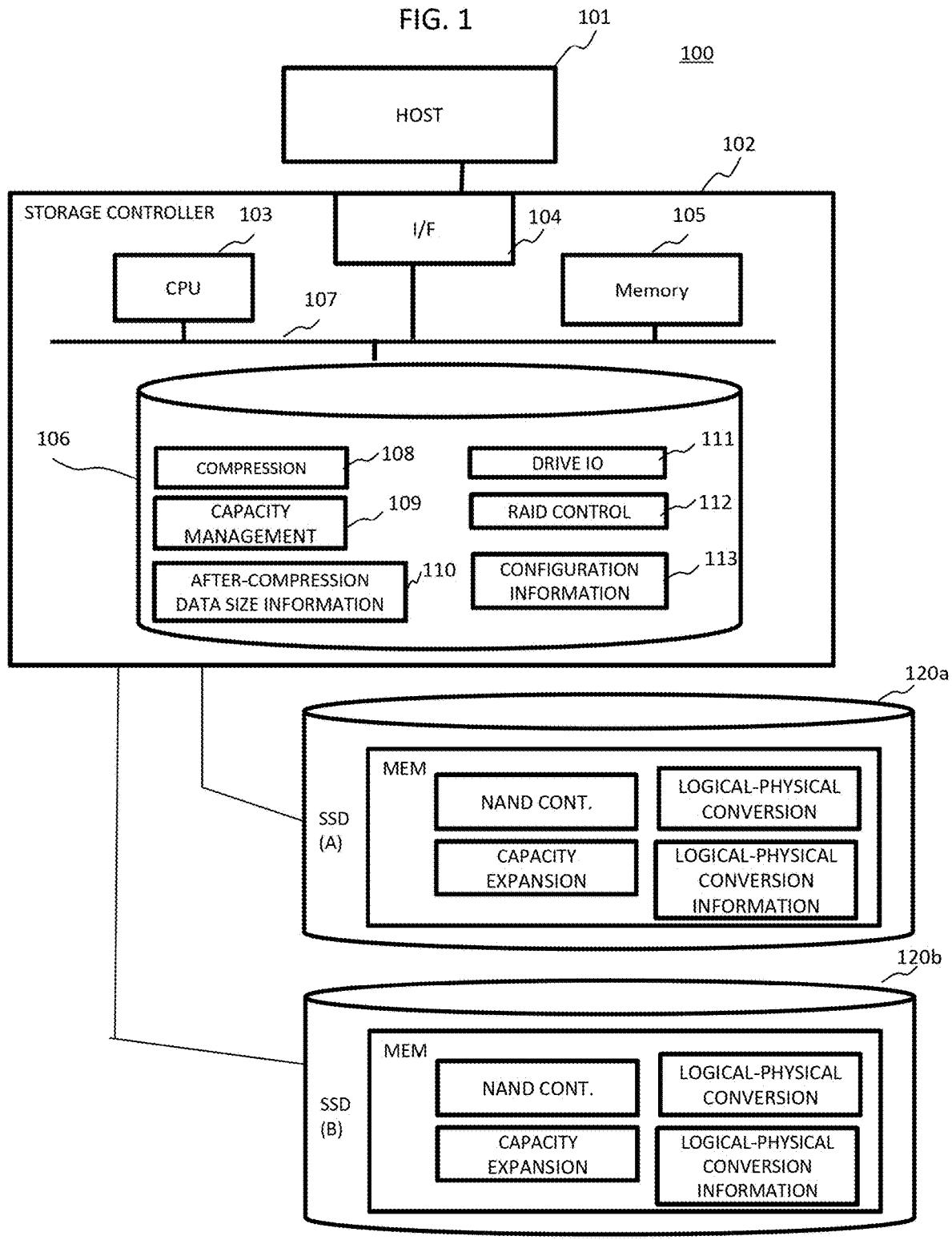
FIG. 1 is a configuration diagram of an information processing system.

FIG. 1 is a configuration diagram of an information processing system according to this embodiment.

An information processing system 100 includes one or a plurality of host computers 101, a storage controller 102, and a plurality of solid state drives (SSDs) which are nonvolatile memory drives. The storage controller 102 and the plurality of SSDs constitute a storage system. The host 101 and the storage controller 102 are configured to be connected to each other via a network configured with a local area network (LAN), the Internet, or the like.

The host 101 is a computer device provided with information resources such as a central processing unit (CPU) and a memory and is configured with, for example, an open system server or a cloud server. The host 101 transmits a write command and a read command to the storage controller 102 via the network in response to a user operation or a request from an installed program.

The storage controller 102 is a device in which software necessary for providing a function as a storage to the host 101 is installed. Usually, the storage controller 102 is configured with a plurality of redundant storage controllers.

The storage controller 102 includes a CPU (processor) 103, a memory 105, a front-end interface (network I/F) 104, a storage device 106, and a bus 107 for connecting these components.

The processor 103 is hardware that controls entire operations of the storage controller 102. The processor 103 reads/writes data from/to a corresponding SSD 120 in response to the read command or the write command given from the host 101.

In addition, the memory 105 is configured with, for example, a semiconductor memory such as a synchronous dynamic random access memory (SDRAM) and is used for storing and holding necessary programs (including an operating system (OS)) and data. The memory 105 is a main memory of the processor 103 and stores a program (storage control program or the like) executed by the processor 103, a management table referred to by the processor 103, or the like.

Although FIG. 1 illustrates a form in which an after-compression data size information 110 and configuration information 113 are stored in the storage device 106 as management information, and read out to the memory 105, the after-compression data size information 110 and the configuration information 113 may be stored in the memory 105 instead of a form in which the after-compression data size information 110 and the configuration information 113 are read out from the storage device 106. In addition, the memory 105 is also used as a disk cache (cache memory) of the storage controller 102.

The processor 103 reads the program stored in the storage device 106 to the memory 105 and executes the program to provide the storage function to the host 101 or the like. For this reason, although the actual processing subject is the processor 103, in order to explain the processes of each program in an easy-to-understand manner, the program may be described as the subject.

The network I/F 104 is an interface to the host 101 and performs protocol control at the time of communicating with the host 101 via the network.

The storage device 106 stores an OS, a storage control program, a backup of a management table, and the like. In this embodiment, description will be made by using a compression program 108, a capacity management program 109, a drive IO Program 111, and a RAID control program 112 as storage control programs. Besides, snapshots and deduplication are included, but description thereof is omitted because the snapshots and deduplication are not used in the description of the operations of this embodiment. The RAID control program 112 includes configuration information for configuring a RAID such as a volume and an SSD constituting each volume in addition to a RAID function which is a data protection function. In addition, the storage device 106 includes, for example, an HDD or a solid state drive (SSD).

A plurality of the SSDs 120 are connected to the storage controller 102 via a back-end IF (not illustrated).

The compression program 108 realizes a function of compressing a data received from the host. The capacity management program 109 manages a total capacity of the SSD 120, a used capacity used by storing data, and a free capacity in which no data is stored. In addition, the drive IO program 111 executes an IO process for the SSD drive 120. The RAID control program 112 realizes a RAID function, strips the data from the host according to the RAID configuration, and calculates a predetermined address of each SSD drive 120 in order to store the striped data. The configuration information 113 stores a table referred to by the RAID control program 112, such as a relationship between a volume which is a storage area provided to the host 101 and an SSD which constitutes the volume. The configuration information 113 manages the addresses of all the SSD drives 120 connected to the storage controller 102, and the used physical capacity and the free physical capacity are managed by the capacity management program 109.

<2. Configuration of Drive Housing>

Figure 2:
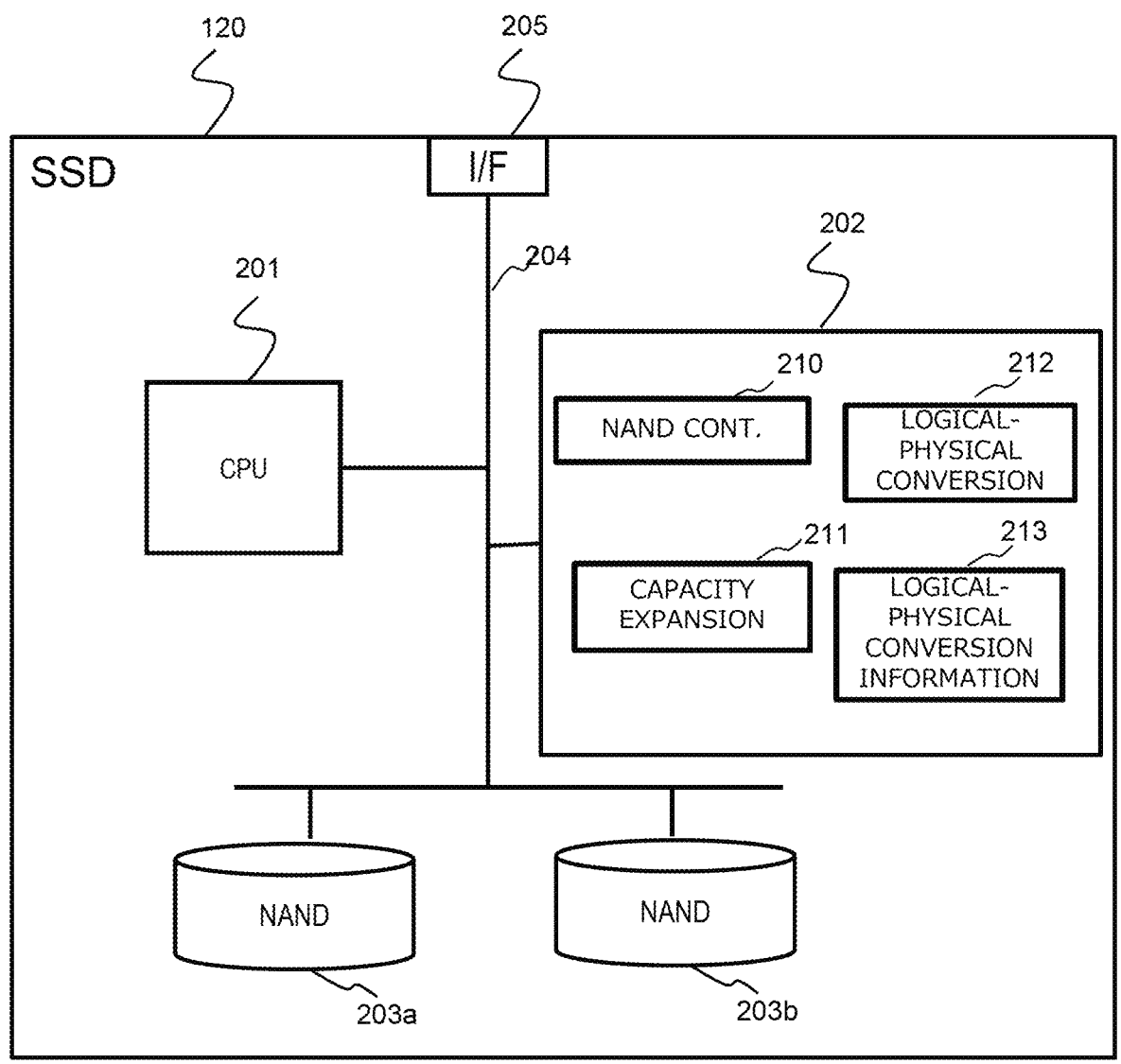
FIG. 2 is a configuration diagram of an SSD drive.

FIG. 2 is a block diagram of the SSD. The SSD 120 is a device in which software necessary for providing functions of controlling the drive and reading/writing from/to a drive which is a storage device from the outside is installed.

The SSD 120 includes a processor (CPU) 201, a memory 202, a network I/F 205, a bus 204, and a NAND flash memory 203 (hereinafter, referred to as a NAND) which is a storage device. The SSD 120 is a storage device constituting a storage area of the storage system and storing a data from the host. The NAND 203 may include a plurality of NAND flash memory chips, but is not limited thereto. The NAND 203 includes a memory cell array. This memory cell array includes a number of NAND blocks (blocks) Bm−1. The blocks B0 to Bm−1 function as units of erasing. The block may also be referred to as a "physical block" or an "erase block".

The block includes a large number of pages (physical pages). That is, each of the blocks includes pages P0 to Pn−1. In the NAND 203, data reading and data writing are executed in units of pages. Data erasing is executed in units of blocks.

The processor 201 is hardware that controls the entire operations of the SSD 120. Data are read/written from/to the corresponding NAND 203 in response to the read command and the write command given from the processor 201 and the storage controller 102, and data transfer is performed with respect to the host 101 in response to a data transfer command given from the storage controller 102.

In addition, the memory 202 is configured with, for example, a semiconductor memory such as a synchronous dynamic random access memory (SDRAM) and is used to store and hold necessary programs (including an operating system (OS)) and data to function as a cache memory.

The memory 202 is a main memory of the processor 201 and stores a program (an SSD drive control program and the like) executed by the processor 201 and a management table and the like referred to by the processor 201. In this embodiment, NAND control 210, capacity expansion 211, and logical-physical conversion 212 are included as the programs, and logical-physical conversion information 213 is indicated as an example of the management table.

The NAND control program 210 controls data reading/writing operations of the NAND flash memory. The capacity expansion program 211 realizes a function of providing the storage controller 102 with a capacity larger than the actual capacity of the NAND. The SSD 120 itself does not have a compression function but provides the storage controller 102 with a logical address space larger than an actual physical capacity. As a result, the logical address space provided to the host 101 by the storage controller 102 can be aligned.

That is, by allowing the logical address space of the SSD to correspond to the physical address space of the storage controller 102 and associating each leading address, the address management system is commonized, and thus, the complicated logical-physical address conversion of the storage controller 102 is simplified.

The logical-physical conversion program 212 calculates the correspondence between the logical address space provided to the storage controller 102 by the SSD drive 120 and the physical address space of the NAND 203 in which the data is actually written. The logical-physical conversion information 213 is so-called mapping information and manages the correspondence between the logical address space provided to the storage controller 102 by the SSD drive 120 and the physical address space of the NAND 203 in which the data is written. In this embodiment, the physical capacity of the SSD 120 is expanded by the capacity expansion program 211, the logical address space provided to the storage controller 102 by the SSD 120 is created, and the expanded logical address space is aligned to the physical address space managed by the storage controller 102, so that the address management system is commonized and the logical-physical address conversion of the storage controller 102 can be obtained by simple calculation.

Various processes are executed by the processor 201 executing the program stored in the memory 202. For this reason, although the actual processing subject is the processor 201, in order to explain the processes of each program in an easy-to-understand manner, the program may be described as the subject.

The network I/F 205 is connected by using SCSI, Serial Attached SCSI (SAS), ATA, Serial ATA (SATA), PCI Express (PCIe), Ethernet (registered trademark), Fibre channel, NVM Express (NVMe) (registered trademark), or the like.

<3. Various Management Information>

FIG. 3 illustrates after-compression data size information managed by the storage controller. The after-compression data size information 110 is stored in the storage device 106 of the storage controller 102.

The after-compression data size information 110 manages leading addresses 301 and after-compression data sizes 302 in correspondence with the leading addresses 301. The leading address 301 is managed with "0x0000" and "0x0020" and the compression management size interval. In this embodiment, the compression management size is described as 16 kB, but the invention is not limited thereto. The leading address is a physical address space recognized by the storage controller 102 and is an address corresponding to a logical address space provided by the SSD drive 120.

The after-compression data size information is referred to by the capacity management program 109, and thus, the free capacity of the SSD drive 120 is checked. This is performed so that the storage controller 102 manages the physical capacity of the NAND not so as to be run out of during system operation since a larger capacity than the actual physical capacity of the NAND is provided as a logical address space from the SSD 120 to the storage controller 102 by the capacity expansion program 211 of the SSD 120.

If storage controller 102 reads with the before-compression size at the time of the reading process, determines the valid data (excluding the range in which the zero data continues), and obtains the after-compression data size, the after-compression data size information 110 may be set to be unnecessary.

FIG. 4A is a diagram illustrating an example of a logical-physical conversion table managed by the SSD.

The logical-physical conversion information 213 manages logical addresses 401 provided to the storage controller 102 by the SSD 120 and physical addresses 402 of the NAND flash memory 203 corresponding to the logical addresses 401. For example, it is indicated that a physical address "NAND #10-Block #20-Page #30-Offset #0" corresponds to a logical address "0x0000". In addition, a logical address "0x0030" indicates the state where no physical address is allocated, that is, the logical address "0x0030" indicates the state where no data is stored. The logical address 401 is information representing a space larger than the actual physical capacity of the NAND by the capacity expansion program 211.

In the example of FIG. 4A, it is illustrated that the logical address 401 is 8 kB which is a unit of address management in the SSD 120. In a case where the logical address is implemented differently from the unit of address management of the SSD 120, the unit of address management in the SSD may be an intermediate address, for example, a logical address that is an integral multiple of the intermediate address.

In addition, the physical address 402 of the write destination differs depending on the NAND and the number of storages. Herein, as an example, a case is illustrated in which the number of NANDs is about 16, writing is performed on pages of 16 kB, and the data position starting from the middle of the page is managed by an offset. For example, the physical address "NAND #10-Block #20-Page #30-Offset #0" specifies the physical address having a NAND identifier of "10", a block number of "20", a page number of "30", and an offset of "0" in a plurality of NANDs.

FIG. 4B is a diagram illustrating an example of the logical-physical conversion table managed by SSD. FIG. 4B illustrates a change in the physical address when the logical address "0x0040" is overwritten from the state of FIG. 4A. In a case where there is a data overwrite instruction for the physical address "NAND #4-Block #40-Page #40-Offset #7" corresponding to the logical address "0x0040", although the logical address "0x0040" is not changed, due to the impossibility of overwriting which is a property of the NAND, the correspondence of the physical address "NAND #4-Block #40-Page #40-Offset #7" to the logical address "0x0040" is not released (unmapped), and a different physical address "NAND #10-Block #14-Page #21-Offset #4" is allocated to the logical address "0x0040".

<4. Writing Operation>

Figure 5:
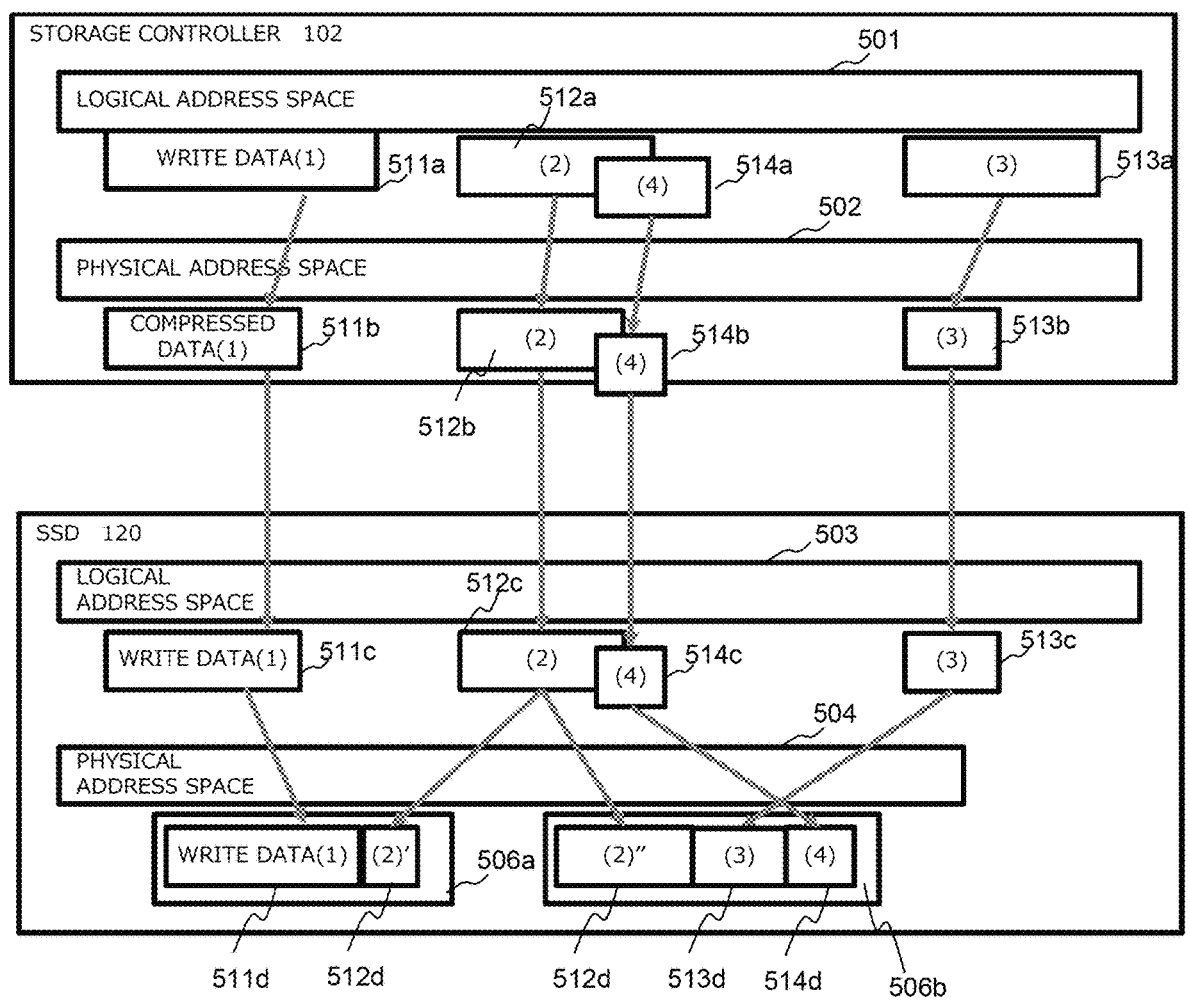
FIG. 5 is an operation conceptual diagram at the time of writing.

FIG. 5 is an operation conceptual diagram at the time of writing, and a compression writing process will be described. The storage controller 102 manages the correspondence between a logical address space 501 provided as a logical storage area to the host 101 and a physical address space 502 which is an address space that manages the storage area of the SSD drive 120. The logical address space 501 and the physical address space 502 have a common size and a common unit of management. For example, the common unit of management is the same size and the same unit of management, but the same size and the same unit of management include sizes and units of management that can be easily replaced with substantially the same size and substantially the same unit of management.

The SSD 120 manages the correspondence between a logical address space 503 provided to the storage controller 102 and a physical address space 504 which is an address space of the NAND. The physical address space 504 that manages the physical storage area of the SSD 120 corresponds to the physical page (16 kB) 506 of the NAND 203. The logical address space 503 on the SSD drive 120 side is larger than the actual physical capacity (physical address space 504) of the NAND by the capacity expansion program 211 and corresponds to the physical address space 502 of the storage controller 102 with the common size and the common unit of management. In other words, the address management is commonized. The common size and the common unit of management are, for example, the same size and the same unit of management, but the same size and the same unit of management include sizes and units of management that can be easily replaced with substantially the same size and substantially the same unit of management.

FIG. 5 illustrates an example in which the writing process is performed in the order of a write data (1) 511a, a write data (2) 512a, a write data (3) 513a, and a write data (4) 514a.

The write data (1) 511a is compressed by the storage controller 102 to generate a compressed data (1) 511b. The write data (1) 511a is written in the logical address space 501, and the compressed data (1) 511b is written in the physical address space 502. Since the logical address space 501 and the physical address space 502 are information for managing addresses, actual data are not written in these spaces but are managed as written.

Herein, the logical address space 501 and the physical address space 502 of the storage controller 102 correspond to each other with a common size and a unit of management, and the leading addresses of the respective units of management are aligned. For example, the common size and the common unit of management are the same size and the same unit of management, but the same size and the same unit of management include sizes and units of management that can be easily replaced with substantially the same size and substantially the same unit of management.

When the SSD 120 receives the compressed data 511b from the storage controller 102, the SSD 120 writes the compressed data 511b as a write data (1) 511c in the logical address space 503. By referring to the logical-physical conversion information 213, the write data written in the logical address space 503 is written as a write data (1) 511d in a NAND physical page 506a. Since the logical address space 503 is information for managing addresses, actual data are not written in these spaces but are managed as written.

Similarly, the write data (2) 512a is also compressed, written as a compressed data (2) 512b in the physical address space 502, and transmitted to the SSD 120. In the SSD 120, the compressed data (2) 512b is written as a write data 512c in the logical address space 503 and written as a write data (2)' 512d and a write data (2)" 512d in two physical pages 506a and 506b. In addition, the write data (2)' 512d is written to the address following the write data (1) 511d.

Similarly, the write data (3) 513a is also compressed, written to the physical address space of the storage controller 102, the logical address space 503 of the SSD 120, and the physical address space 504 of the SSD 120, and stored as a write data (3) 513d in the physical page 506b. In addition, the write data (3) 513d is written to the physical address following the write data (2)" 512d".

The write data (4) is a data that overwrites a portion of the write data (2). The write data (4) 514a is written in the logical address space 501, and the compressed data is written in the physical address space 502. The data is also written in the logical address space 503 on the SSD 120 side. At this time, in the logical address space 503, a portion of the write data (2) 512C which is the old data is overwritten by the write data (4) 514C which is the new data. In the physical address space 504, the write data (4) which is the new data is written as a write data (4) 514*d* to physical addresses different from those of the write data (2)' and (2)".

As illustrated in FIG. 5, the logical address space 501 and the physical address space 502 of the storage controller 102 correspond to each other with a common size and a common unit of management, so that the leading addresses of the respective units of management are aligned. The logical address space 501 and the physical address space 502 of the storage controller 102 and the logical address space 503 of the SSD 120 corresponding to the physical address space 502 of the storage controller 102 correspond to each other with the common size and the common unit of management, so that the leading addresses of the respective units of management are similarly aligned. In other words, the address management system is commonized. For example, the common size and the common unit of management are the same size and the same unit of management, but the same size and the same unit of management include sizes and units of management that can be easily replaced with substantially the same size and substantially the same unit of management.

Therefore, the storage controller 102 writes the data by using the leading address of the before-compression data as it is. The SSD 120 provides a larger space (compressed portion) as the logical address space 503 than the physical address space 504 owned.

The storage controller 102 performs padding in units of compression in order to use the leading address of the before-compression data as it is. The details will be described with reference to FIGS. 11A and 12. In addition, in some cases, as the leading address of the before-compression data, each of the leading addresses after division by the before-compression management size may be used. The details at this time will be described with reference to FIGS. 9 and 10.

Figure 6A:
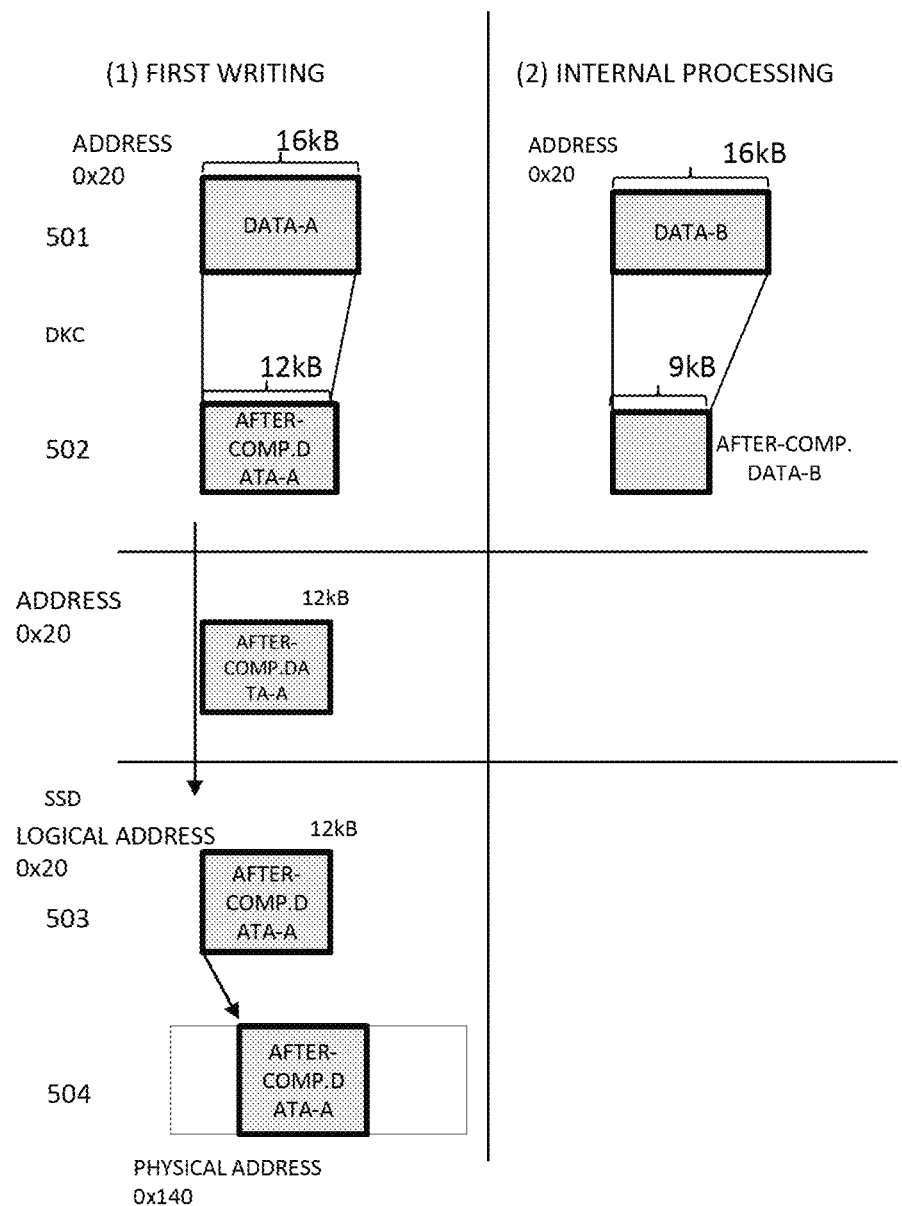
FIG. 6A is an operation conceptual diagram illustrating an overwriting operation.

FIG. 6A is an operation conceptual diagram illustrating an overwriting operation.

(1) First Writing

First, a first writing operation will be described. The storage controller 102 writes "Data-A" of 16 kB, which is a unit of compression and management (before-compression data size), to the address "0x20" in the logical address space 501. The storage controller 102 compresses the "Data-A" to generate an "after-compression data Data-A". The size of the "after-compression data Data-A" is 12 kB. The unit of compression and management (before-compression data size) 16 kB is an example, and other sizes such as 32 kB and 64 kB may be used.

The after-compression data Data-A of 12 kB is written in the physical address space 502 and transmitted to the SSD 120. The after-compression data Data-A is written to the logical address "0x20" in the logical address space 503 of the SSD 120. The after-compression data Data-A is written to the physical address "0x140" in the physical address space 504.

(2) Internal Processing

Next, the writing of the "Data-B" of 16 kB to the address "0x20" in the logical address space 501 is received. The storage controller 102 compresses the Data-B to generate an "after-compression data Data-B" of 9 kB and writes the after-compression data Data-B in the physical address space 502.

Figure 6B:
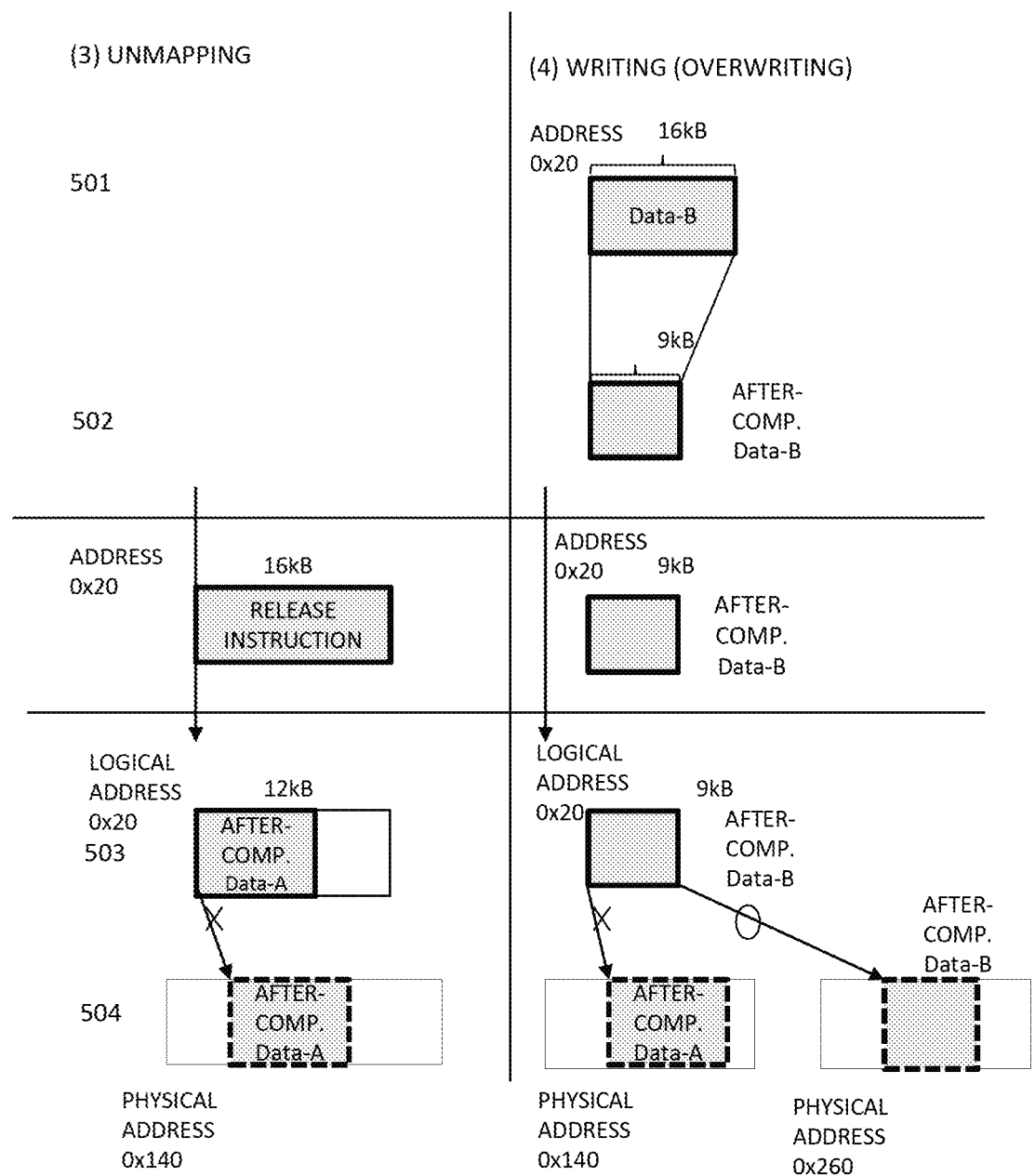
FIG. 6B is an operation conceptual diagram illustrating an overwriting operation.

FIG. 6B is an operation conceptual diagram illustrating the overwriting operation and is a continuation of FIG. 6A.

(3) Unmapping

Next, at the time of updating data, unmapping is issued to the before-compression data size (normal unit of compression and management×N), the old data is invalidated, and the new data is written to the same address. The logical-physical conversion is performed by the SSD function, and the data is stored to an appropriate physical address. In FIG. 6B, a release instruction (unmap) is instructed for the before-compression data size (16 kB) of the address "0x20" in the logical address space 501. Then, the SSD 120 releases the allocation of the physical address "0x140" to the logical address "0x20".

(4) Writing (Overwriting)

The storage controller 102 writes "Data-B" of 16 kB, which is a unit of compression and management, to the address "0x20" in the logical address space 501. The storage controller 102 compresses the "Data-B" to generate an "after-compression data Data-B". The size of the "after-compression data Data-B" is 9 kB. The after-compression data Data-B of 9 kB is written in the physical address space 502 and transmitted to the SSD 120. The after-compression data Data-B is written to the logical address "0x20" in the logical address space 503 of the SSD 120. The after-compression data Data-B is written to the physical address "0x260" in the physical address space 504.

As described above, the logical address space 501 and physical address space 502 of the storage controller 102 and the logical address space 503 of the SSD 120 correspond to each other with the common size and the common unit of management, so that the leading addresses of the respective units of management are aligned with the compression management size. Therefore, there is no need to perform the address conversion between these address spaces, and the conversion of the logical address and physical address of the SSD 120 may be performed, so that it is possible to eliminate the waste of the management resources caused by performing the logical-physical address conversion of the storage controller of the storage system and the logical-physical address conversion of the controller of the SSD in a twofold manner. For example, the common size and the common unit of management are the same size and the same unit of management, but the same size and the same unit of management include sizes and units of management that can be easily replaced with substantially the same size and substantially the same unit of management.

Figure 7A:
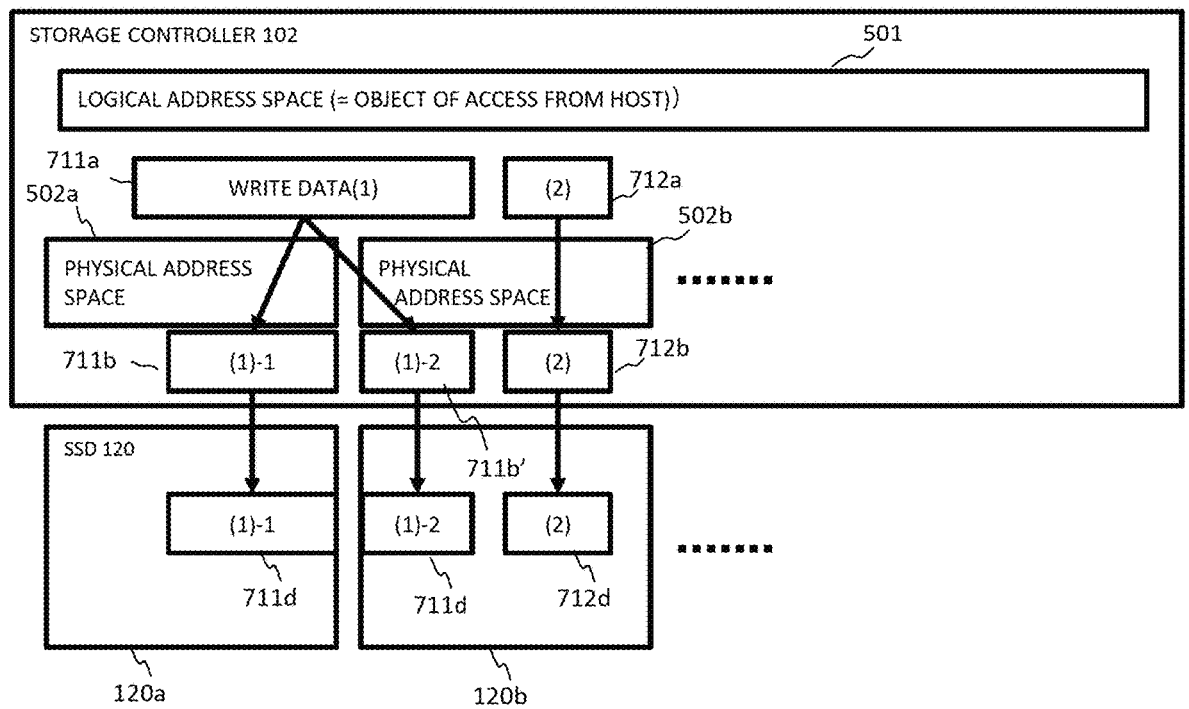
FIG. 7A is a conceptual diagram illustrating a RAID control operation at the time of writing.

FIG. 7A is a conceptual diagram illustrating a RAID control operation at the time of writing. For the data protection, the storage controller 102 divides (stripes) the write data from the host 101 in order to perform the writing to each drive according to the RAID configuration information.

Figure 7B:
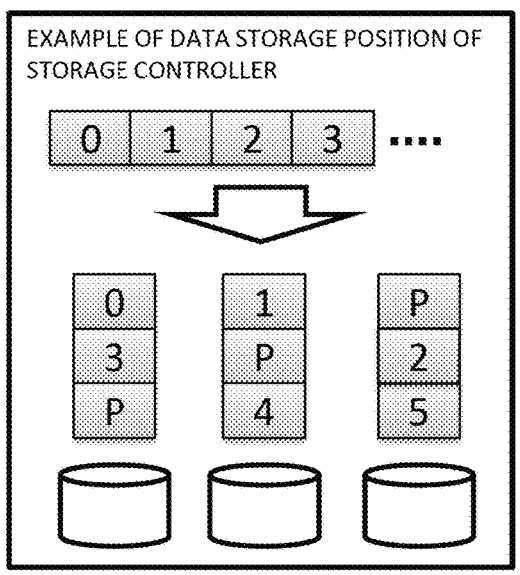
FIG. 7B is a conceptual diagram illustrating a striping operation of the storage controller.

FIG. 7B illustrates an operation concept of striping. Data "0, 1, 2, 3, . . . " from the host 101 is divided and written (striped) to each drive according to the configuration information stored as the management information of the RAID control program 112. The size of data "0", "1", and the like written to each drive is 64 kB. This size is merely an example, and other sizes may be used.

Returning to FIG. 7A, the RAID control will be described. The logical address space 501 of the storage controller 102 is provided to the host 101 and receives write data 711*a* and 712*a* from the host 101. The write data (1) is divided (maximum 64 kB) by the RAID control program 112 to become a data to be written to drives 120*a* and 120*b*. The divided data is compressed for each unit of compression and management (16 kB) to become an after-compression data 711*b*. FIG. 7A illustrates an example in which the write data (1) 711*a* is divided into two striped data. The striped data is divided in units of compression and management, and the write data divided for each unit of compression and management is compressed. Since the operation (compressing/writing process) of writing the compressed data in the physical address space 502 of the storage controller 102, the logical address space 503 and the physical address space 504 of the SSD 120, and each page 506 of the NAND is the same as the operation described in FIG. 5, the description thereof is omitted.

The RAID control program 112, which is a RAID function controlled by the storage controller 102, strips the write data. The storage controller 102 compresses the striped data for each unit of compression management and generates the after-compression data. The logical address space of the storage controller, the physical address space of the storage controller corresponding to the logical addresses of a plurality of the SSDs, and the logical address space of a plurality of the SSDs correspond to each other with a common size and a common unit of management, so that the leading addresses of the respective units of management are aligned. Therefore, since each SSD stores the after-compression data generated by the storage controller 102, only by managing the logical-physical conversion information 213 (logical-physical conversion table) indicating the correspondence relationship between the physical address space 504 for managing the physical resources of each SSD and the logical address space 503 corresponding to the physical address space, it is possible to support the RAID function.

Figure 8:
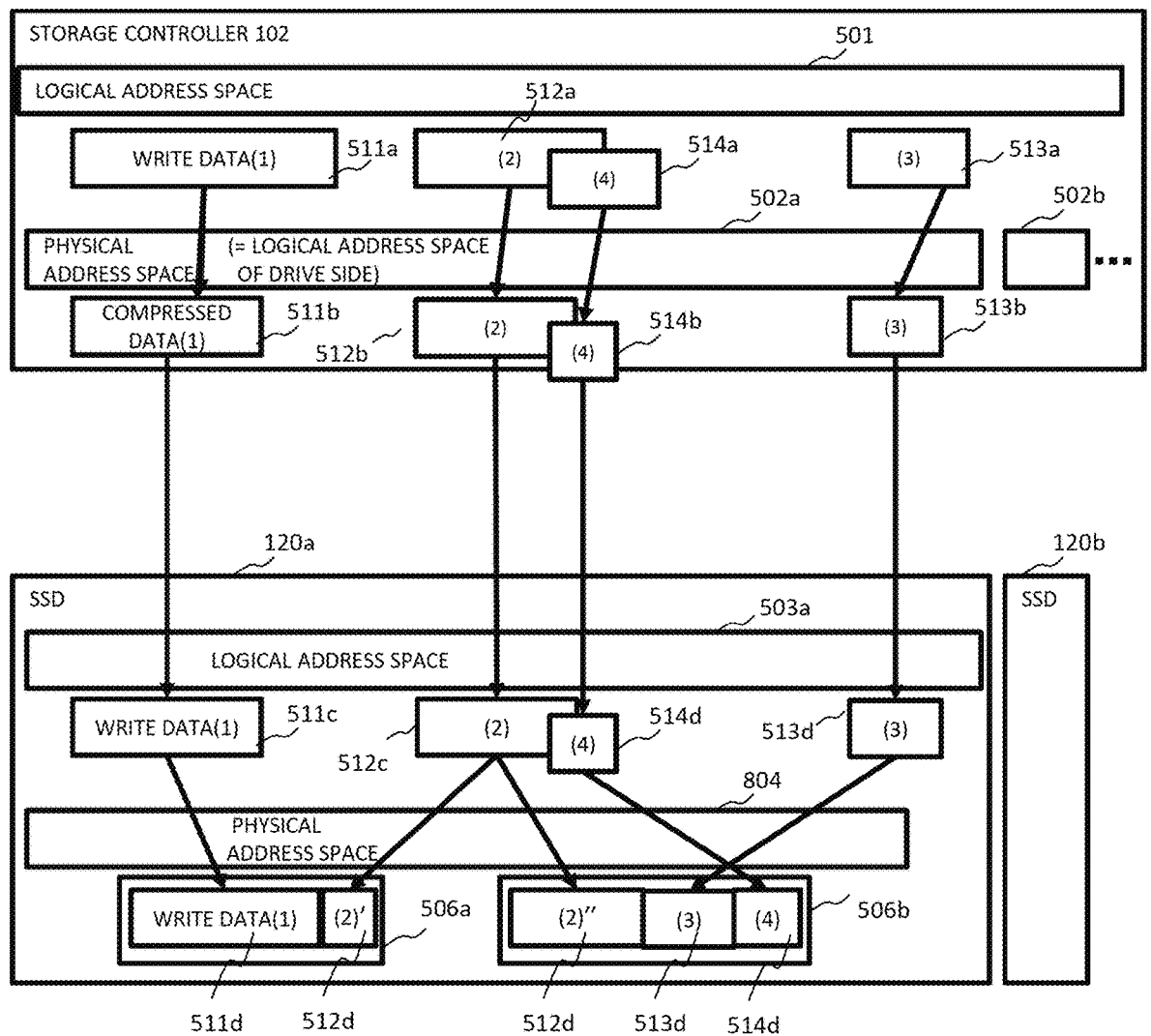
FIG. 8 is a conceptual diagram illustrating a writing operation at the time of executing striping.

FIG. 8 is a conceptual diagram illustrating the writing operation at the time of executing striping. Although FIG. 8 is similar to FIG. 5 in many respects, FIG. 5 illustrates an example of one SSD for the simplicity, and FIG. 8 illustrates a plurality of SSDs 120a and 120b and illustrates the writing operation at the time of executing striping.

The physical addresses space 502 for constituting the logical address space 501 of the storage controller 102 includes a physical address space 502a and a physical address space 502b corresponding to the logical address space of the SSD 120a and the logical address space of the SSD 120b, respectively. The physical address space 502a of the storage controller 102 corresponds to a logical address space 503a of the SSD 120a. That is, by allowing a plurality of the physical address spaces 502a and 502b of the storage controller to correspond to the logical addresses of the SSDs 120a and 120b, the logical addresses of the SSDs 120a and 120b are integrated into one logical address space 501.

The storage controller 102 allows a plurality of the logical address spaces 503 provided from each SSD to correspond to a plurality of the physical address spaces 502, respectively, so that a plurality of the physical address spaces 502 constitutes one logical address space 501. Therefore, the storage controller 102 can manage the RAID configuration information by using the physical address spaces 502 and can perform the data striping on each SSD drive. In addition, the logical address space 503 provided from each SSD 120 to the storage controller 102 is a space which is larger than the actual physical capacity obtained by expanding the physical address space 504 by the capacity expansion program 211.

The expansion rate by the capacity expansion program 211 can be arbitrarily determined. The expansion rate is basically the same value for each SSD, but a different expansion rate may be applied to each SSD. For example, the expansion rate may be decreased according to the number of times of writing in the NAND 203. In other words, if the number of times of writing exceeds a certain value, in order to suppress the writing operation, the logical address space is allowed to be small. In any case, since the storage controller 102 needs to manage the usage status of the physical capacity, the expansion rate is configured to be set from the storage controller 102 to each SSD 120 or so that the storage controller 102 receives the information on the expansion rate from each SSD 120.

Figure 9:
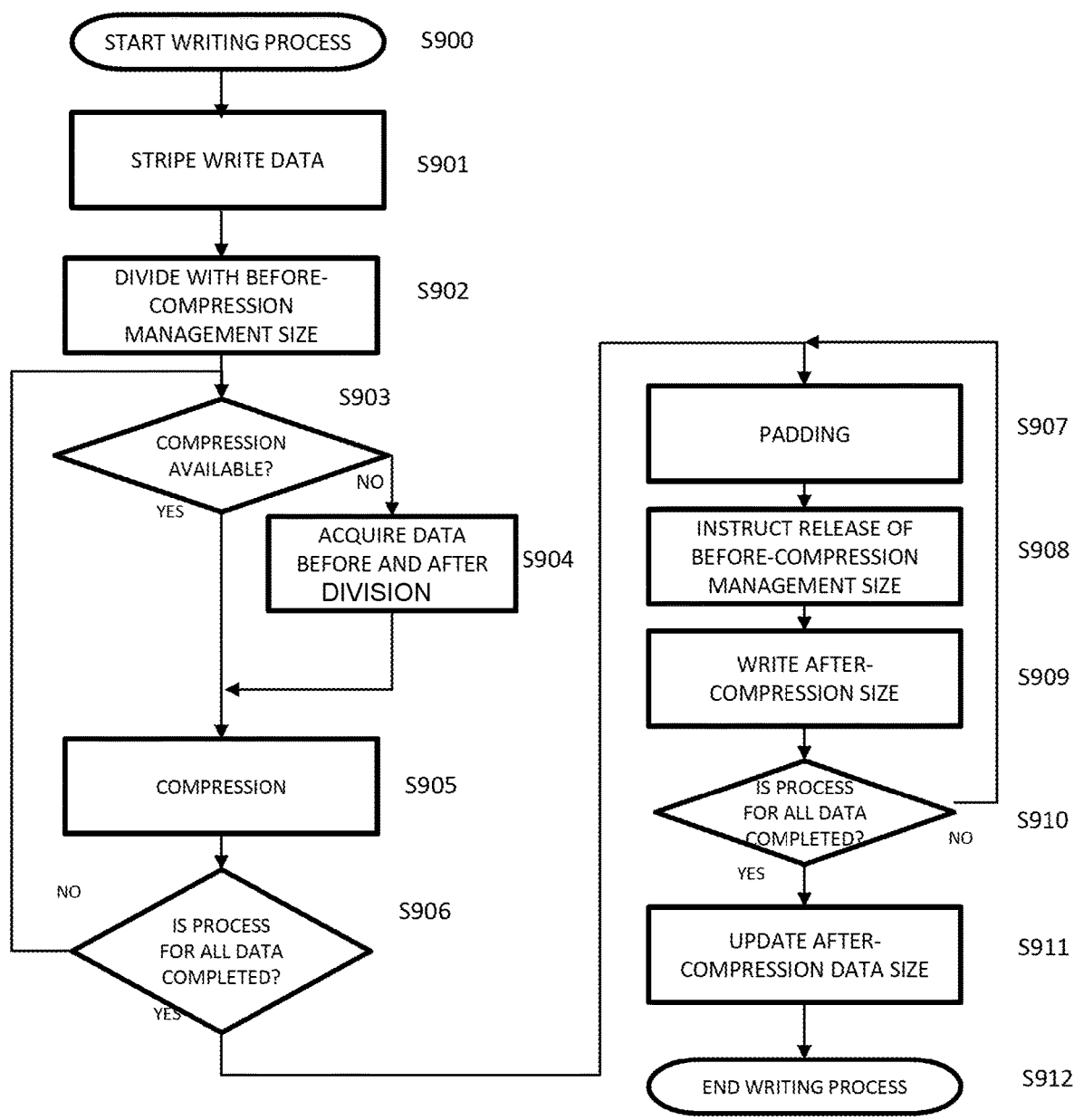
FIG. 9 is a flowchart illustrating a writing operation of the storage controller.

FIG. 9 is a flowchart illustrating the writing operation of the storage controller.

The writing process is started by receiving the write data from the host 101 (S900). The storage controller 102 refers to the RAID configuration information 113, and the RAID control program 112 strips the write data, for example, in units of 64 kB (S901). The compression program 108 divides the striped write data into before-compression management sizes (S902). The before-compression management size is, for example, 16 kB.

Next, the compression program 108 determines whether or not the data divided into the before-compression management sizes can be compressed (S903). If the data can be compressed, the process proceeds to step S905, and if not, the process proceeds to step S904. In step S904, the data before and after the division are acquired to be set as the data that can be compressed (S904). In step S905, the compression program 108 compresses the data divided into the before-compression management sizes (S905) and determines whether or not the data divided with all the before-compression management sizes has been compressed (S906). If there is a data that is not compressed, the process returns to step S902, and the same process is performed.

If the compression of all the data divided into the before-compression management size is completed, padding for writing "0" in the location (address space that has become free due to the data reduced by the compression) where the before-compression management size remains is performed (S907). In a case where the write data is written to the same logical address, in order to release the old data area, an instruction to release the before-compression management size of the logical address space of the storage controller 102 is performed (S908). After that, the SSD 120 writes the after-compression data in the physical address space (S909). The processes from step S907 to step S910 are repeated until all the data are completed.

After that, the capacity management program 109 updates the after-compression data size information, manages the physical capacity (S911), and ends the writing process (S912).

In addition, the release instruction in step S908 may be performed after writing of the data of the after-compression size in step S909 to the SSD 120 or after updating the after-compression data size information in step S911.

<5. Reading Operation>

FIG. 10 is a flowchart illustrating the reading operation of the storage controller.

When the storage controller 102 receives a read command from the host 101, the reading process is started (S1001). The read data length included in the read command is divided into the before-compression management sizes (S1002). After that, the RAID control program 112 refers to the after-compression data size information 110 and acquires the after-compression data sizes (S1003).

The drive IO program 111 reads the after-compression data from the SSD 120 (S1004). The compression program 108 decompresses the read compressed data (S1005).

It is determined whether or not the process for all the data divided into the before-compression management sizes has been completed (S1006). If the process has not been completed, the process returns to step S1003 to repeat the process. If the process has been completed, the storage controller 102 transfers the read data to the host 101 (S1007) and ends the reading process.

<6. Writing Operation (RAID Control)>

Figure 11A:
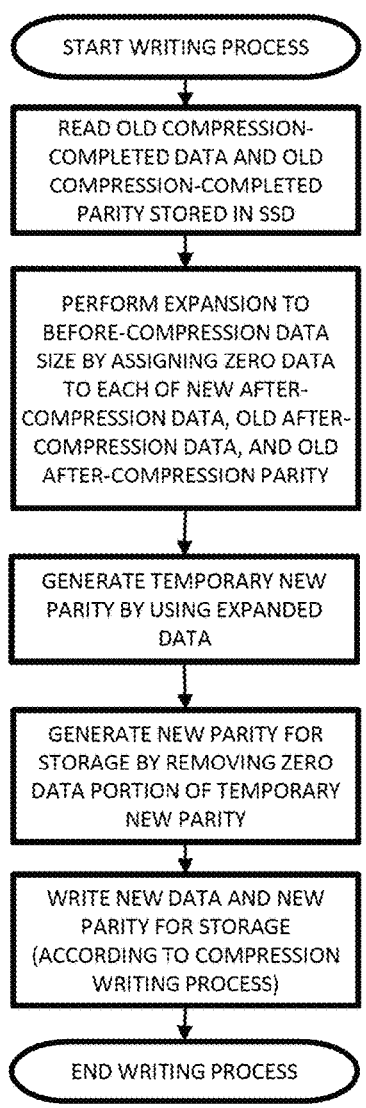
FIG. 11A is a flowchart illustrating an example of a RAID process using an after-compression data.

FIG. 11A is a flowchart illustrating an example of the RAID process using the after-compression data. When the storage controller 102 receives a write command from the host 101, the storage controller 102 starts the writing process (S1101). The storage controller 102 reads an old compression-completed data and an old compression-completed parity stored in the SSD 120 by the RAID control program 112 (S1102).

Next, the RAID control program 112 performs expansion to the before-compression data size by assigning a zero data to each of the new after-compression data, the old after-compression data, and the old after-compression parity (S1103). The RAID control program 112 generates a temporary new parity by using the expanded data (S1104). A new parity for storage is generated by removing a zero data portion of the temporary new parity (S1105), and the new data and the new parity for storage are written according to the compression writing process (S1106).

Since the writing operation illustrated in FIG. 11A performs parity calculation without decompressing the compressed data, the decompression process can be made unnecessary, and the processing speed can be increased.

Figure 11B:
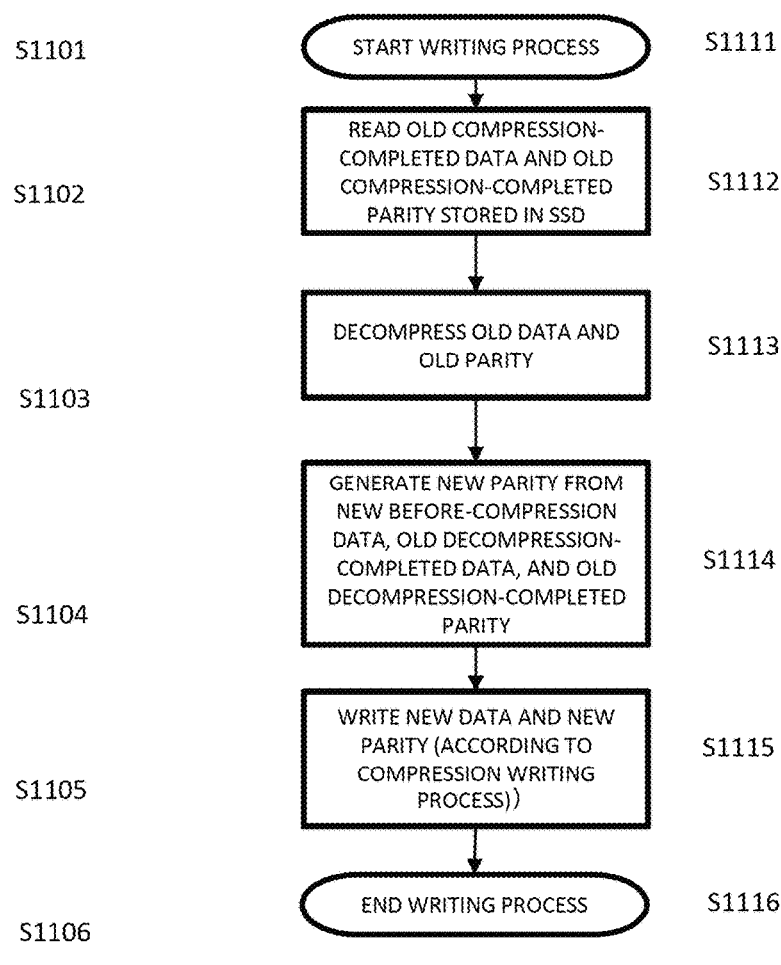
FIG. 11B is a flowchart illustrating an example of a RAID process using a before-compression data.

FIG. 11B is a flowchart illustrating an example of the RAID process using the before-compression data different from that of FIG. 11A.

When the storage controller 102 receives the write command from the host 101, the storage controller 102 starts the writing process (S1111). The storage controller 102 reads the old compression-completed data and the old compression-completed parity stored in the SSD (S1112). Next, the old data and the old parity are decompressed by the compression program 108 (S1113). The RAID control program 112 generates a new parity from the new before-compression data, the old after-decompression data and the old after-decompression parity (S1114). The new data and the new parity are written according to the compression writing process (S1115).

In comparison with the process of FIG. 11A, in the process illustrated in FIG. 11B, the compressed data needs to be decompressed once, but it is not necessary to perform padding the compressed data with the zero data or to remove the zero data from the temporary new parity. In the compressing/writing process where the logical address space 501 and the physical address space 502 of the storage controller 102 and the logical address space 503 of the SSD 120 of this embodiment correspond to each other with the same size and the same unit of management and the leading address of each unit of management is aligned with the compression management size, the data management is easier in FIG. 11A.

FIG. 12 is a diagram illustrating the operations of the RAID process after data compression.

(1) The storage controller 102 receives a write data (new data) 1201 from the host 101.

The old data (striped data) corresponding to the new data is read from the SSD 120a and the SSD 120b.

The new data is compressed, and a zero data 1211b is assigned so that the before-compression data size is obtained. Similarly, zero data 1212b and 1213b are assigned to old data 1212a and 1213a (striped data) read from the SSD 120a and SSD 120b so that the before-compression data size is obtained, and thus, a parity 1220a is generated from the new data and old data to which the zero data is assigned.

The new after-compression data is written to the SSD 120a', and the new parity 1220a from which zero data has been removed is also written to the SSD 120b.

Herein, for example, in a case where the unit of management of the before-compression data is set to 16 kB and the unit of management of the after-compression data is set to 0.5 kB, the write data is divided every 16 kB, and a data having a length of 0.5 kB is generated from the leading address. In addition, at the time of overwriting, by performing releasing of data in units of 16 kB (releasing of the logical-physical table on the SSD side by the WriteSame command or the like), overwriting corresponding to the change in the length of the after-compression data is performed.

As described above, this embodiment supports the capacity expansion function on the SSD side and performs the logical-physical conversion that requires a complicated table by performing normal address allocation after compression on the storage controller side (in not a log format but an overwrite format) on the SSD side.

The storage controller 102 allows a plurality of the logical address spaces 503 provided from the respective SSD to correspond to a plurality of the physical address spaces 502, so that the plurality of physical address spaces 502 constitutes one logical address space 501. Therefore, the storage controller 102 can manage the RAID configuration information by using the physical address space 502 and can perform striping of the data on each SSD drive.

In addition, the logical address space of the storage controller, the physical address space of the storage controller corresponding to the logical addresses of a plurality of the SSDs, and the logical address space of a plurality of the SSDs correspond to each other with a common size and a common unit of management, so that the leading addresses of the respective units of management are aligned. Therefore, since each SSD stores the after-compression data generated by the storage controller 102, only by managing the logical-physical conversion information 213 (logical-physical conversion table) indicating the correspondence relationship between the physical address space 504 for managing the physical resources of each SSD and the logical address space 503 corresponding to the physical address space, it is possible to support the RAID function.

What is claimed is:

1. A storage system comprising:
a storage controller connected to a host;
and a plurality of nonvolatile memory drives connected to the storage controller, wherein the storage controller i) compresses a data from the host, ii) provides the host with a first logical address space as a logical storage area, iii) manages a before-compression data to be stored in the first logical address space, and iv) manages an after-compression data to be written to a plurality of first physical address spaces that correspond to the first logical address space and the plurality of physical address spaces that respectively manage storage areas of the plurality of nonvolatile memory drives,
wherein each of the plurality of nonvolatile memory drives i) includes nonvolatile memory, ii) includes a second physical address space that manages a physical storage area of the nonvolatile memory and a second logical address space that corresponds to the second physical address space and the second logical address space corresponds to each of the plurality of first physical address spaces, iii) manages the after-compression data to be stored in the second logical address space, and iv) writes the after-compression data to the second physical address space, wherein one of the plurality of second logical address spaces and one of the plurality of first physical address spaces are managed with a common size and a common management size, and the first logical address space and the plurality of first physical address spaces are managed with the common size and the common management size, and wherein, in the first logical address space, the plurality of first physical address spaces, and the plurality of second logical address spaces, leading addresses are aligned with the common management size.

2. The storage system according to claim 1, wherein each of the plurality of nonvolatile memory drives has an expansion function for expanding the second physical address space so as to correspond to one of the plurality of first physical address spaces with the common size.

3. The storage system according to claim 2, wherein the storage controller has after-compression data size information for managing an after-compression data size for each management size.

4. The storage system according to claim 2, wherein each of the plurality of nonvolatile memory drives has a logical-physical conversion table for managing a correspondence relationship between a logical address, of the second logical address space, provided to the storage controller by each of the plurality of nonvolatile memory drives and a physical address of the nonvolatile memory.

5. The storage system according to claim 2, wherein the storage controller stripes a write data according to configuration information when the write data is received from the host, divides the striped write data into a before-compression management size, compresses the striped write data, divided into the before-compression management size, to generate respective first after-compression data, assigns a zero data to a difference between the respective first after-compression data and the before-compression management size, manages the respective first after-compression data to be stored in respective second logical space of the plurality of second logical address spaces, and writes the respective first after-compression data to respective second physical space, of the plurality of second physical address spaces, corresponding to the respective second logical space.

6. The storage system according to claim 5, wherein the storage controller writes, to one of the plurality of second physical address spaces, a first data obtained by assigning the zero data to the respective first after-compression data, a second data obtained by reading an old data stored at an address of the first logical address space to which the write data is written and assigning the zero data to the read old data, a third data obtained by reading a parity data of the old data as an old parity data and assigning the zero data to the old parity data, and a new parity obtained by generating a parity from the first data, the second data, and the third data, wherein the zero data is removed from the generated parity.

7. A data compression method for a storage system having a storage controller connected to a host and a plurality of nonvolatile memory drives connected to the storage controller, wherein the storage controller i) compresses a data from the host, ii) provides the host with a first logical address space as a logical storage area, iii) manages a before-compression data to be stored in the first logical address space, and iv) manages an after-compression data to be written to a plurality of first physical address spaces that correspond to the first logical address space and the plurality of physical address spaces that respectively manage storage areas of the plurality of nonvolatile memory drives, wherein each of the plurality of nonvolatile memory drives i) includes nonvolatile memory, ii) includes a second physical address space that manages a physical storage area of the nonvolatile memory and a second logical address space that corresponds to the second physical address space and the second logical address space corresponds to each of the plurality of first physical address spaces, iii) manages the after-compression data to be stored in the second logical address space, and iv) writes the after-compression data to the second physical address space, wherein one of the plurality of second logical address spaces and one of the plurality of first physical address spaces are managed with a common size and a common management size, and the first logical address space and the plurality of first physical address spaces are managed with the common size and the common management size, and wherein, in the first logical address space, the plurality of first physical address spaces, and the plurality of second logical address spaces, leading addresses are aligned with the common management size.

8. The data compression method for a storage system according to claim 7, wherein each of the plurality of nonvolatile memory drives has an expansion function for expanding the second physical address space so as to correspond to one of the plurality of first physical address spaces with the common size.

9. The data compression method for a storage system according to claim 8, wherein the storage controller stripes a write data according to configuration information when the write data is received from the host, divides the striped write data into a before-compression management size, compresses the striped write data, divided into the before-compression management size, to generate respective first after-compression data, assigns a zero data to a difference between the respective first after-compression data and the before-compression management size, manages the respective first after-compression data to be stored in respective second logical space of the plurality of second logical address spaces, and writes the respective first after-compression data to respective second physical space of the plurality of second physical address spaces corresponding to the respective second logical space.

10. The data compression method for a storage system according to claim 9, wherein the storage controller writes, to one of the plurality of second physical address spaces, a first data obtained by assigning the zero data to the respective first after-compression data, a second data obtained by reading an old data stored at an address of the first logical address space to which the write data is written and assigning the zero data to the read old data, a third data obtained by reading a parity data of the old data as an old parity data and assigning the zero data to the old parity data, and a new parity obtained by generating a parity from the first data, the second data, and the third data and removing the zero data from the generated parity.

11. A storage system having a storage controller connected to a host, the storage controller to compress a data from the host and the storage system having a plurality of nonvolatile memory drives connected to the storage controller, each of the plurality of nonvolatile memory drives i) includes a nonvolatile memory and ii) to write a compressed data, compressed by the storage controller, to the nonvolatile memory, wherein the storage controller provides the host with a first logical address space as a logical storage area and the storage controller includes a plurality of first physical address spaces that correspond to the first logical address space and the plurality of first physical address spaces respectively manage storage areas of the plurality of nonvolatile memory drives, wherein each of the plurality of nonvolatile memory drives includes a second physical address space that manages a physical storage area of the nonvolatile memory, a second logical address space that corresponds to the second physical address space, and the second logical address space that corresponds to each of the plurality of first physical address spaces, and wherein all the second logical address spaces of the plurality of nonvolatile memories and the first logical address space are managed with a common size and a common management size, and leading addresses are aligned with the common management size.

* * * * *